US011060620B2

(12) United States Patent
Walter et al.

(10) Patent No.: US 11,060,620 B2
(45) Date of Patent: *Jul. 13, 2021

(54) VALVE FOR FREE-FLOWING MEDIA, IN PARTICULAR GLUE VALVE

(71) Applicant: Focke & Co. (GmbH & Co. KG), Verden (DE)

(72) Inventors: Jan-Christian Walter, Hamburg (DE); Marc-Daniel Stegen, Hamburg (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/721,997

(22) Filed: Dec. 20, 2019

(65) Prior Publication Data

US 2020/0124183 A1 Apr. 23, 2020

Related U.S. Application Data

(63) Continuation of application No. 15/609,652, filed on May 31, 2017, now Pat. No. 10,550,944.

(30) Foreign Application Priority Data

Jun. 6, 2016 (DE) .......................... 102016006785.3

(51) Int. Cl.
*F16K 1/52* (2006.01)
*F16K 31/06* (2006.01)
*B05C 5/02* (2006.01)

(52) U.S. Cl.
CPC ............ *F16K 1/523* (2013.01); *B05C 5/0225* (2013.01); *B05C 5/0279* (2013.01);
(Continued)

(58) Field of Classification Search
CPC .. F16K 1/523; F16K 31/0675; F16K 31/0651; F16K 31/0655; B05C 5/0225; B05C 5/0279
See application file for complete search history.

(56) References Cited

U.S. PATENT DOCUMENTS 4,647,011 A 3/1987 Contzen
8,151,824 B2 ‡ 4/2012 Williams ............ F16K 31/0627
137/62

(Continued)

FOREIGN PATENT DOCUMENTS

DE 3742414 A1 ‡ 6/1989
DE 3742414 A1 6/1989
(Continued)

OTHER PUBLICATIONS

Deutsches Patent—Und Markenamt (German Patent and Trademark Office), Recherchebericht (search in connection with priority application), Jan. 18, 2017.‡
(Continued)

*Primary Examiner* — Eric Keasel
(74) *Attorney, Agent, or Firm* — Laurence P. Colton; Smith Tempel Blaha LLC

(57) ABSTRACT

A valve for free-flowing media, such as a glue valve, with a valve housing, and with a closure member, such as a valve tappet, which is movable in the valve housing by means of an electromagnet and which bears with a closure piece on a valve seat in the closed position of the valve and which sits at least partially in a continuous interior of a one-piece coil carrier on which the windings of a coil of the electromagnet are wound, and having two terminal receivers for a dosing unit and a valve lift adjustment unit with an elongate abutment part which is arranged at least in part in the interior of the coil carrier and which limits a movement of the
(Continued)

closure member in the direction of the valve lift adjustment unit, with the valve lift adjustment unit being is secured on the coil carrier.

16 Claims, 3 Drawing Sheets

(52) U.S. Cl.
CPC ...... *F16K 31/0651* (2013.01); *F16K 31/0655* (2013.01); *F16K 31/0675* (2013.01)

(56) References Cited

U.S. PATENT DOCUMENTS

| | | | | |
|---|---|---|---|---|
| 8,833,732 | B2 ‡ | 9/2014 | Heiko | F16K 31/082 251/129.15 |
| 8,991,784 | B2 ‡ | 3/2015 | Jurgens | B05C 5/0225 137/315.03 |
| 10,670,164 | B2 * | 6/2020 | Walter | F16K 27/029 |
| 2006/0169936 | A1 ‡ | 8/2006 | Nonaka | F16K 31/0655 251/12 |
| 2010/0133453 | A1 ‡ | 6/2010 | Hoppe | F16K 31/082 251/65 |
| 2011/0118098 | A1 ‡ | 5/2011 | Harms | B05C 5/0279 493/2 |
| 2012/0037823 | A1 ‡ | 2/2012 | Jurgens | B05C 5/0225 251/129.15 |
| 2012/0313019 | A1 ‡ | 12/2012 | Neudeck | F16K 31/082 251/65 |
| 2015/0053876 | A1 ‡ | 2/2015 | Neuhaus | H01F 5/02 251/129.04 |

FOREIGN PATENT DOCUMENTS

| | | | |
|---|---|---|---|
| DE | 69006161 | T2 | 6/1994 |
| DE | 102008022851 | A1 ‡ | 12/2009 |
| DE | 102008022851 | A1 | 12/2009 |
| DE | 102009015231 | A1 | 10/2010 |
| DE | 102014001897 | A1 ‡ | 8/2015 |
| DE | 102014001897 | A1 | 8/2015 |

OTHER PUBLICATIONS

European Patent Office, Europaischer Recherchenbericht (search in a related application), Dec. 7, 2017.‡

European Patent Office, Europaischer Recherchenbericht (search in a related application), Oct. 14, 2020.

\* cited by examiner
‡ imported from a related application

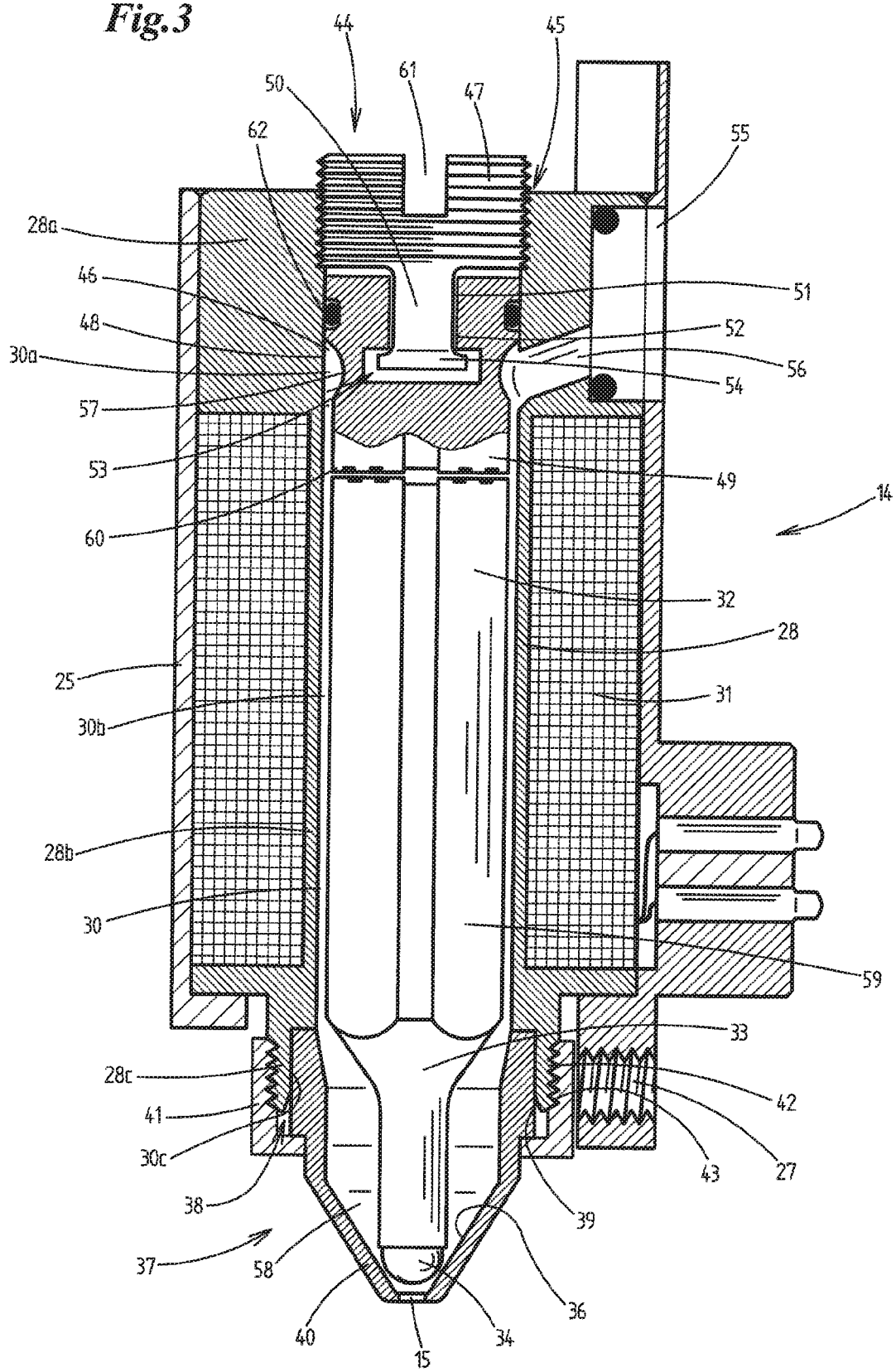

VALVE FOR FREE-FLOWING MEDIA, IN PARTICULAR GLUE VALVE

STATEMENT OF RELATED APPLICATIONS

This patent application is a continuation of U.S. patent application Ser. No. 15/609,652 having a filing date of 31 May 2017, which claims the benefit of and priority on German Patent Application No. 10 2016 006 785.3 having a filing date of 6 Jun. 2017.

BACKGROUND OF THE INVENTION

Technical Field

The invention relates to a valve for free-flowing media, in particular a glue valve, with a valve housing, and with a closure member, in particular a valve tappet, which is movable in the valve housing by means of an electromagnet and which bears with a closure piece on a valve seat in the closed position of the valve and which sits at least partially in an in particular continuous interior of a preferably one-piece coil carrier on which the windings of a coil of the electromagnet are wound, and with a valve lift adjustment unit with an elongate abutment part which is arranged at least in part in the interior of the coil carrier and which limits a movement of the closure member in the direction of the valve lift adjustment unit, and to a valve for free-flowing media, in particular a glue valve, with a valve housing, and with a closure member, in particular a valve tappet, which is movable in a valve interior by means of an electromagnet and which bears with a closure piece on a valve seat in the closed position of the valve, and with a valve lift adjustment unit for adjusting the valve lift, which valve lift adjustment unit comprises an elongate abutment part which is arranged at least in part in the valve interior and which is modifiable in its axial position in the valve interior by rotation of an adjustment means of the valve lift adjustment unit, which abutment part limits the movement of the closure member in the direction of the valve lift adjustment unit.

PRIOR ART

Valves of this kind are generally constructed from a large number of components. A particular problem in the production of such a valve lies in ensuring that the abutment part of the valve lift adjustment unit, the arrangement of the coil sitting on the coil carrier and the arrangement of the closure member are optimally oriented relative to each other. Manufacturing tolerances also make this difficult. However, imprecise orientations of these components lead to non-optimal behaviour of the respective valve.

A further disadvantage is that changes of the axial position of the abutment part by rotation of the adjustment means generally also lead to a change of the rotation position of the co-rotating abutment part. If the abutment part is not exactly rotationally symmetrical about a longitudinal centre axis, unwanted side effects can occur as a result. For example, in a case in which individual permanent magnets are mounted on the abutment part and interact with permanent magnets on the closure member in order to apply a closing force, such a change of the rotation position of the abutment part can possibly lead to an altered magnetic field and accordingly to an altered closing force.

BRIEF SUMMARY OF THE INVENTION

Proceeding from this, the object of the present invention is to further develop the valves mentioned at the outset.

This object is achieved by a valve for free-flowing media, in particular a glue valve, with a valve housing, and with a closure member, in particular a valve tappet, which is movable in the valve housing by means of an electromagnet and which bears with a closure piece on a valve seat in the closed position of the valve and which sits at least partially in an in particular continuous interior of a preferably one-piece coil carrier on which the windings of a coil of the electromagnet are wound, and with a valve lift adjustment unit with an elongate abutment part which is arranged at least in part in the interior of the coil carrier and which limits a movement of the closure member in the direction of the valve lift adjustment unit, characterized in that the valve lift adjustment unit is secured on the coil carrier, and by a valve for free-flowing media, in particular a glue valve, with a valve housing, and with a closure member, in particular a valve tappet, which is movable in a valve interior by means of an electromagnet and which bears with a closure piece on a valve seat in the closed position of the valve, and with a valve lift adjustment unit for adjusting the valve lift, which valve lift adjustment unit comprises an elongate abutment part which is arranged at least in part in the valve interior and which is modifiable in its axial position in the valve interior by rotation of an adjustment means of the valve lift adjustment unit, which abutment part limits the movement of the closure member in the direction of the valve lift adjustment unit, characterized in that the valve lift adjustment unit is designed in such a way that, during rotation of the adjustment means, the abutment part is moved only axially, without the abutment part rotating too.

A valve according to the invention for free-flowing media accordingly comprises a valve housing, and a closure member, in particular a valve tappet, which is movable in the valve housing by means of an electromagnet and which bears with a closure piece on a valve seat in the closed position of the valve and which sits at least partially in an in particular continuous interior of a preferably one-piece coil carrier on which the windings of a coil of the electromagnet are wound. It further comprises a valve lift adjustment unit with an elongate abutment part which is arranged at least in part in the interior of the coil carrier and which limits a movement of the closure member in the direction of the valve lift adjustment unit. The valve is in particular characterized in that the valve lift adjustment unit is secured on the coil carrier.

According to the invention, the coil carrier assumes a central role or position in the valve. The securing of the valve lift adjustment unit on the coil carrier has the effect, among other things, that the valve lift adjustment unit and in particular the abutment part, on the one hand, and the closure member, on the other hand, which moves in the interior of the coil carrier during the operation of the valve, are already located in a predefined position relative to each other during the valve assembly or are suitably and permanently oriented relative to each other. By contrast, in the valves of the prior art, this is not the case. There, the valve lift adjustment unit is regularly connected to a separate housing part.

Preferably, the valve lift adjustment unit has an abutment part carrier which is connected to a stationary valve component and on which the abutment part is secured. The abutment part carrier can, for example, be an adjustment means of the valve lift adjustment unit, for exampled an adjustment screw, which is connected directly to the (stationary) coil carrier, in particular by screwing. However, the adjustment means as abutment carrier can also be connected or screwed to the coil carrier via an additional connecting component, for example a nut.

As regards the coil carrier, the latter preferably has a coil portion onto which the coil is wound, and also an adjoining (upper) head portion with a (terminal) receiver for the valve lift adjustment unit. The receiver can then accordingly be provided with a thread, such that the abovementioned abutment part carrier/connecting part can be screwed into the latter or is screwed into the latter.

Preferably, the coil portion and the head portion of the coil carrier laterally surround or enclose (in part) the interior of the coil carrier.

In a further embodiment of this concept, the abovementioned (terminal) receiver of the coil carrier for the valve lift adjustment unit can then be formed by an end portion of the coil carrier interior surrounded by the head portion, and by the wall portion of the head portion surrounding this end portion.

A medium delivery duct can be located in the head portion of the coil carrier, which medium delivery duct begins on the outside of the coil carrier and extends as far as the interior of the coil carrier, and through which medium delivery duct the medium to be discharged through the valve can be delivered to the interior.

As regards the configuration of the interior of the coil carrier, it can have greater transverse dimensions in the area of the head portion than in the area of the coil portion.

The coil carrier is preferably produced from a metallic material with high thermal conductivity.

In a particularly preferred development of the invention, the closure member and the valve seat are part of a dosing unit which, like the valve lift adjustment unit, is likewise secured in particular releasably on the coil carrier, preferably by means of a screw connection. In this case, it is not only the valve lift adjustment unit and the closure member that are already located in a predefined position relative to each other during valve assembly and permanently oriented relative to each other, but additionally also the dosing unit, in particular the closure member that is part thereof.

In particular, the coil carrier, the valve lift adjustment unit and the dosing unit can be designed in such a way and oriented relative to one another in such a way that the abutment part of the valve lift adjustment unit and the closure member of the dosing unit are positioned centrally in the interior of the coil carrier and in succession along a common (longitudinal centre) axis.

Moreover, the closure member is preferably guided in the axial direction through a or the (hollow cylindrical) wall of the coil portion of the coil carrier in the interior.

Preferably, the interior portion of the coil carrier surrounded by the receiver for the valve lift adjustment unit, the interior portion thereof surrounded by the coil portion, and the interior portion thereof surrounded by the receiver for the dosing unit are arranged along a common (longitudinal centre) axis.

The dosing unit can expediently also comprise a nozzle that forms the valve seat.

The interior of the coil carrier can connect to or opens into a valve chamber of the dosing unit surrounded at least in part by the valve seat of the dosing unit.

Moreover, the coil carrier preferably has a foot portion with a (terminal) receiver for the dosing unit, to which the dosing unit is connected in particular releasably, in particular by screwing, preferably by means of a securing part of the dosing unit, for example a (sleeve) nut.

The foot portion is then preferably arranged at one end of the coil carrier, while the head portion is arranged at the other or opposite end of the latter.

A valve according to the invention for free-flowing media comprises a valve housing, and a closure member, in particular a valve tappet, which is movable in a valve interior by means of an electromagnet and which bears with a closure piece on a valve seat in the closed position of the valve, and a valve lift adjustment unit for adjusting the valve lift, which valve lift adjustment unit comprises an elongate abutment part which is arranged at least in part in the valve interior and which is modifiable in its axial position in the valve interior by rotation of an adjustment means of the valve lift adjustment unit, which abutment part limits the movement of the closure member in the direction of the valve lift adjustment unit. It is characterized in that the valve lift adjustment unit is designed in such a way that, during rotation of the adjustment means, the abutment part is moved only axially, without the abutment part rotating too.

This has the effect that the rotation position of the abutment part remains unchanged during an axial movement thereof. The disadvantages arising from an altered rotation position as may otherwise occur in the prior art (see explanations given above) are thereby effectively avoided.

Such a valve can additionally have one, several or all of the aforementioned features, and also one, several or all of the features of all preferred developments in this application, either individually or in each meaningful combination. In particular, it can also have the above-specified coil carrier as a central component, but it does not need to have this.

As regards the adjustment means specifically, it is connected to the abutment part in particular in such a way as to be rotatable about its longitudinal centre axis.

The rotatable connection of the adjustment means is preferably configured in such a way that the abutment part, with respect to axial movements of the adjustment means (or with respect to movements of the adjustment means towards and away from the closure member), is positively coupled thereto.

In a further embodiment of these concepts, the adjustment means has an outer thread with which it is screwed into a movement thread of a receiver for the adjustment means, and it has a pin connected thereto in a rotationally fixed manner, which pin is mounted rotatably in an elongate and in particular cylindrical cavity of a pin receiver connected in particular integrally to the abutment part in a rotationally fixed manner. The pin is secured in the pin receiver against axial relative movements between pin and pin receiver, in particular by a form-fit connection between pin and pin receiver.

As regards the abutment part, the latter is mounted in a rotationally secured manner on a stationary component of the valve, but so as to be movable in the axial direction, in particular by a frictionally engaging connection, preferably by a sealing ring between the abutment part and the stationary component.

The stationary component of the valve on which the abutment part is secured in terms of rotation, but movable in the axial direction, can be a coil carrier or the abovementioned coil carrier for the coil of the electromagnet or, if appropriate, a connection component or the abovementioned connection component, which is inserted into a or the receiver of the coil carrier for the valve lift adjustment unit.

In a further embodiment of the invention, the abutment part, at its end facing towards the closure member, has at least one of the permanent magnets, which interacts with at least one rectified permanent magnet of the closure member, at the end thereof facing towards the abutment part, in such a way that the magnets apply a closing force to the closure member in the closed position of the closure member.

BRIEF DESCRIPTION OF THE DRAWINGS

Further features of the present invention will become clear from the accompanying patent claims, from the following description of a preferred illustrative embodiment of the invention and from the accompanying drawings, in which:

FIG. 3 shows the detail III from FIG. 2 in an enlarged view.

DETAILED DESCRIPTION OF PREFERRED EMBODIMENTS

Details of (electro)valves 14 according to the invention are explained below. In the present case, these valves 14 are part of a valve arrangement 10 with a plurality of individual valves 14. It will be appreciated, however, that the invention can also include individual valves or individually operated valves outside such an arrangement 10.

Figure 1:
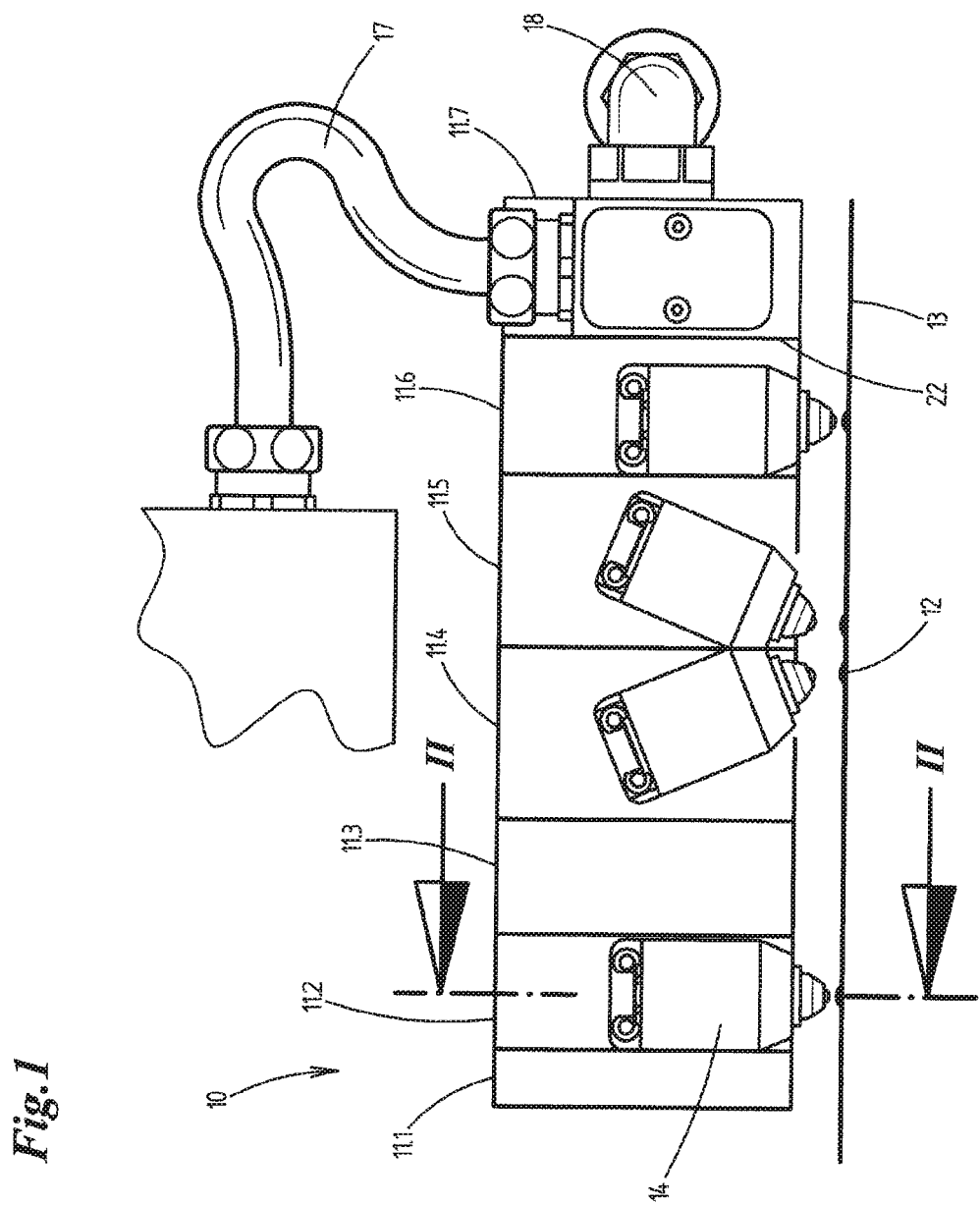
FIG. 1 shows a plan view of a valve arrangement composed of a plurality of individual valves according to the invention.

The valve arrangement 10 or installation shown in FIG. 1, for discharging free-flowing media onto surfaces, is constructed from several individual modules 11.1-11.7. To simplify matters, all of these individual modules are designated 11.1-11.7 in the context of the application. A similar valve arrangement is also disclosed in DE 10 2014 001 897 A1, of which the content is herewith incorporated.

In the illustrative embodiment shown, the valve arrangement 10 serves to apply glue, in particular hot glue, (in several bands) onto surfaces of blanks or material webs of paper, film or the like used in the production of cigarette packs. However, it is of course also within the context of the invention to use the valve arrangement 10 to apply other fluid or free-flowing media, for example paints, lacquers or the like, to the surfaces of items of another kind.

With the valves 14 of the valve arrangement 10, individual (small) portions of medium or glue portions 12 are respectively applied, for example, to a blank 13. In the present case, the individual modules 11.1-11.7 are arranged in succession in the longitudinal extent of the valve arrangement 10 in a common row. Respective pairs of two adjacent individual modules 11.1-11.7 are connected releasably to each other. In the present case, by means of screws arranged in (continuous) screw holes 63.

Certain individual modules, namely the individual modules 11.2, 11.4-11.6, each have a valve or a valve unit 14, each of these with a (lower) dispensing or dosing opening 15. The free-flowing medium in the process is applied to the surface of the blank 12 via these individual modules 11.2, 11.4-11.6 with their respective valve unit 14, i.e. via the respective dosing opening 15.

The individual module 11.7 serves to attach the valve arrangement 10 to power supply lines coming in particular from the higher-order (packaging) machine, in particular from the machine control, and if appropriate additional control lines 16. In the present case, the lines 16 are routed in the interior of a cable tube 17. Starting from the module 11.7, the lines 16 are routed through the valve arrangement 10 to the individual modules 11.2, 11.4-11.6 with valve unit 14.

The module 11.7 moreover serves to attach the valve arrangement 10 to a source of medium, for example a tank containing hot glue. For this purpose, a corresponding medium tube, in this case heated, ends on the individual module 11.7. From the individual module 11.7, the medium routed through the tube 18 is distributed inside the valve arrangement 10 and routed to the individual modules 11.2, 11.4-11.6 with valve unit 14. The individual module 11.7 also serves for attachment to preferred control lines (not shown) coming from the source of medium, or from a control appliance thereof. These control lines are also routed to the individual modules 11.2, 11.4-11.6 with valve unit 14.

The modules 11.1, 11.3 are intermediate modules with which in particular the overall width of the valve arrangement 10 can be influenced. In addition, provision can be made that the valve units 14, as can be seen in FIG. 1, are arranged at an angle to one another and in particular have lateral bevels on the respective housing in order to reduce the track spacing between adjacent valve units 14.

Each individual module 11.1-11.7 has a main body 19. The individual main bodies 19 each have, on at least one (outer) face, a flange surface on which there bears a corresponding flange surface of the main body 19 of a or the individual module 11.1-11.7 that is adjacent thereto in the common row. With the exception of the end module 11.1, all of the other main bodies 19 of the individual modules 11.2-11.7 each have a main duct 20 for medium, which main duct 20 in the present case preferably runs parallel to the longitudinal extent of the valve arrangement 10. In any case, the main ducts 20 for medium of the individual modules 11.1-11.7, in which other individual modules in the row of individual modules 11.1-11.7 adjoin on two sides, extend continuously from the (outer) face with flange surface to the other (outer) face with flange surface. The individual main ducts 20 for medium of the main bodies 19 of the individual modules 11.2-11.7 abut each other, in particular in a flush arrangement, resulting overall in a continuous duct which extends from the main body 19 of the module 11.2 to the main body 19 of the module 11.7.

Moreover, the main bodies 19 of the individual modules 11.2, 11.4-11.6 with valve unit 14 each have a medium branch duct 21 issuing from the respective main duct 20. The branch ducts 21 are each routed as far as a securing (outer) face 22 of the respective main body 19. The respective valve unit 14 is secured (releasably) on each securing face 22. Besides the main duct 20 for medium, the main bodies 19 of the individual modules 11.2-11.7 additionally each have at least one cable duct 23 extending preferably parallel to the respective main duct 20 for medium.

On the one hand, the power lines and optionally the control lines 16 for the valve units 14 are routed through the cable duct 23, wherein the main bodies 19 of the corresponding individual modules 11.2, 11.4-11.6 each additionally have a cable branch duct 24 which issues from the respective cable duct 23 and through which lines 16 routed through the cable duct 23 are routed onwards as far as the valve units 14. On the other hand, power lines (not shown) for heating elements are optionally routed through the cable duct 23. The cable ducts 23 of the individual modules are flush in the same way as the main ducts 20 for medium and likewise form a continuous duct.

As regards the valve units 14, in the present case these are electrically operated (electro)magnetic valves. The valve units 14 each have a housing 25. Each valve unit 14 is connected releasably to the respective main body 19, as has already been indicated above, for example by screws 26 which engage in a corresponding bore 27 of the valve unit 14.

The construction of the respective valve or of the respective valve unit 14 is particularly important. As the central component of the (respective) valve 14, a coil carrier 28 designed in particular as a machined rotary part is arranged inside the housing 25.

In the present case, the coil carrier 28 is configured in one piece, preferably from metal, although it can in principle also comprise multiple parts.

The coil carrier 28 has an elongate and upright interior or cavity (central opening 30) which is continuous in the present case and which is enclosed by a respective wall of the coil carrier 28. In the present case, the interior 30 has a substantially hollow cylindrical design. Both the coil carrier 28 and also accordingly the interior 30 enclosed by it have several sub-portions.

The coil carrier 28 has an (upper) head portion 28a at one end, an adjoining (central) coil (carrier) portion 28b and, at its other end, a (lower) foot portion 28c adjoining the coil portion 28b. The respective portions 28a, 28b, 28c each enclose an assigned sub-portion 30a, 30c and 30c of the interior 30. In the area of the head portion 28a, the interior 30a has greater transverse dimensions than in the area of the coil portion 28b and/or than in the interior 30b surrounded by the coil portion.

Figure 2:
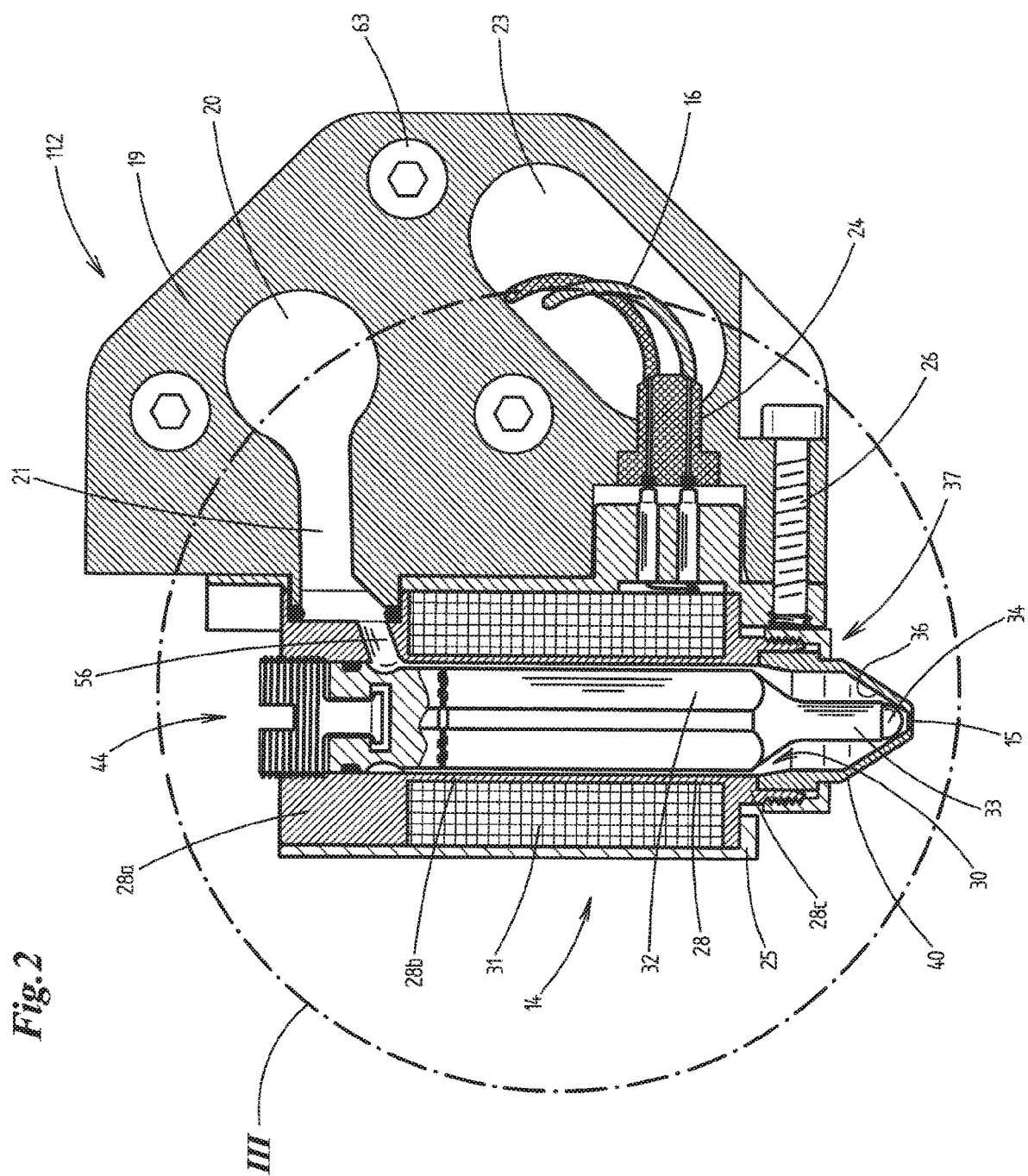
FIG. 2 shows a cross section along the section line II-II in FIG. 1.

The windings of one or more electrically operated coils 31 of the electromagnet of the valve 14 are wound on the outer face of the coil portion 28b. The power (supply) lines 16, which are shown in FIG. 2 and through which the coil 31 can be supplied with operating current, lead to the respective coil.

In the interior 30 of the coil carrier 28, more precisely in the interior of the electromagnet or of the coil 31, a closure member or dosing member 32, in the present case a valve tappet, is arranged movably as a core or armature of the electromagnet.

A closure means or a closure piece 34, in the present case a ball, is arranged on a lower shaft 33 of the closure member 32. The closure means 34 is assigned to the valve opening or dosing opening 15 of the valve 14. The valve opening 15 is situated centrally in the area of a funnel-shaped valve seat 36. In the closed position of the valve 14, the closure means 34 bears on seat surfaces, in the present case conical seat surfaces, of the valve seat 36.

The closure member 32 and the valve seat 36 are part of a dosing unit 37. The dosing unit 37 is secured releasably on the coil carrier 28. Specifically, it is connected to a terminal receiver 38 for the dosing unit 37 of the foot portion 28c of the coil carrier 28.

At the free end of the foot portion 28c of the coil carrier 28, the receiver 38 for the dosing unit 37 comprises an opening 39, which is formed by an end portion of the interior 30 of the coil carrier 28 and which is surrounded by a corresponding end portion of the foot portion 28c. The dosing unit 37, in the present case specifically a nozzle part (nozzle) 40 having the valve seat 36, sits in the receiver 38 or the opening 39.

A securing part 41, in present case a (sleeve) nut, is fixedly connected to the nozzle part 40 and is releasably connected to a (hollow cylindrical) receiver wall 42 of the receiver 38 of the coil carrier 28 or of the foot portion 28c thereof. In the present case, the receiver wall 42 for this purpose has a thread 43, which is screwed onto a corresponding mating thread of the securing part 41.

A valve lift adjustment unit 44 is arranged in the area of the head portion 28a of the coil carrier 28. This valve lift adjustment unit 44 is connected to a terminal receiver 45 for the adjustment unit 44 of the head portion 28a of the coil carrier 28.

The receiver 45 for the valve lift adjustment unit 44 in this case comprises, at the free end of the head portion 28a of the coil carrier 28, an opening 46 which is formed by an end portion of the interior 30 of the coil carrier 28 and which is surrounded by a corresponding end portion of the head portion 28a. The valve lift adjustment unit 44, in the present case an adjustment means 47 thereof, sits in the receiver 45 or the opening 46.

Specifically, the valve lift adjustment unit 44 is screwed onto the receiver 45 of the head portion 28a of the coil carrier 28 or to a wall 48 of the receiver 45.

For this purpose, the adjustment means 47, in the present case an adjustment screw, is provided on the outside with a movement thread. A corresponding mating thread is arranged on the inside in the corresponding receiver wall 48 formed by the head portion 28a.

The adjustment means 47 has, at the end (at the upper end) thereof, a recess 61 or an attachment piece 61 on which a tool can be attached, for example a hexagon wrench. Rotations of the adjustment means 47 about the longitudinal centre axis thereof, effected by a worker, then cause an axial movement of the adjustment means 47 upwards or downwards, that is to say either in the direction of the end of the valve 14, at which end the dosing opening or the dosing unit 37 is arranged (dosing end), or in the corresponding opposite direction. With the aid of the adjustment means 47, an abutment part 49 of the valve lift adjustment unit 44 connected thereto can in this way be moved axially in the interior 30 in the direction of the dosing end or in the opposite direction.

The valve lift adjustment unit 44 is designed in particular in such a way that, upon rotation of the adjustment means 47, there is no co-rotation of the abutment part 49. In other words, the rotation position of the abutment part 49 relative to the axial or to the longitudinal centre axis remains unchanged.

For this purpose, the adjustment means 47 is connected rotatably to the abutment part 49, wherein it is positively coupled thereto with respect to axial movements of the adjustment means 47. This positive coupling is obtained in the present case by the fact that the adjustment means 47 has a pin 50 which is connected in a rotationally fixed manner and in particular integrally thereto, which pin 50 is mounted rotatably in an elongate, in particular hollow cylindrical cavity or interior 51 of a pin receiver 52 that is connected in particular in a rotationally fixed manner to the abutment part 49. The pin 50 is secured against axial relative movement between pin 50 and pin receiver 52. In the present case, specifically by a form-fit connection 53 between pin 50 and pin receiver 52. Specifically, the pin 50 has at its free end an attachment 54 having a greater diameter than the cavity 51.

If, despite the rotatable mounting of the adjustment means 47 on the abutment part 49, rotational forces are still transmitted to the abutment part 49 upon rotation of the adjustment means 47, then a sealing ring 62 between the abutment part 49 and the inner face of the adjoining wall 48 of the head portion 28a of the coil carrier 28 prevents a rotation of the abutment part 49 by oppositely directed frictional forces.

As has already been mentioned above, the coil carrier 28 is a central component of the valve 14. It extends almost through the entire valve 14 (although this does not have to be the case). Both the dosing unit 37 and the valve lift adjustment unit 44 are secured on the coil carrier 28, and the closure member 32 is mounted movably therein.

The abutment part 49 of the valve lift adjustment unit 44 and the closure member 32 of the dosing unit 37 are positioned centrally in the interior 30 of the coil carrier 28 and in succession along a common (longitudinal centre) axis. The closure member 32 is guided in the axial direction in the interior 30 through a or the (hollow cylindrical) wall of the coil portion 28b of the coil carrier 28.

The interior portion 30a of the coil carrier 28 surrounded by the receiver 45 for the valve lift adjustment unit 44, the interior portion 30b thereof surrounded by the coil portion 28b, and the interior portion 30c thereof surrounded by the receiver 38 for the dosing unit 37 are arranged along a common (longitudinal centre) axis.

The aforementioned measures ultimately lead to an excellent and durable orientation of the aforementioned components. In contrast to the prior art, this arises almost automatically from the design concept, since there is ultimately a self-centering or self-orientation of the aforementioned individual components during the assembly of the valve 14. This effectively prevents tolerance chains, as occur in particular when a multi-part valve housing is used, on the individual housing parts of which the aforementioned components are secured.

As regards the delivery of medium, the medium to be processed (for example glue or another fluid) is delivered to the valve 14 via a connector 55 for medium. The medium passes into the interior 30 of the glue valve 14 via a medium duct 56 arranged in the head portion 28a of the coil carrier 28 and leading from the outside of the head portion 28a as far as the interior 30.

In the present case, it enters the area of the interior 30 in which the abutment part 49 is located. For good flow of medium, the latter therefore has an in particular circumferential, inwardly directed depression or curve in the area in which the medium duct opens into the interior 30 or where said medium duct ends on the outside or outer contour.

During operation, the medium then flows from the upper area of the interior 30, or the interior sub-portion 30a delimited by the head portion 28a, downwards into the interior 30 along the closure member 32 in the direction of the dosing opening 15, specifically into a valve chamber 58 delimited by the nozzle part 40 or by the valve seat 36.

From the valve chamber 58, by suitable movement of the closure member 32, the medium can then be guided or caused to flow out of the valve in a manner controlled by release of the dispensing or dosing opening 15. For this purpose, when electrical current is suitably applied to the electromagnet to exert an opening force, the closure member 32 is moved in the direction of the abutment part 49 counter to a restoring force pressing the closure member 32 into the valve seat, such that the medium can flow out of the valve chamber 58.

For this purpose, the coil 31 of the electromagnet surrounds the closure member 32 at least in part. The closure member 32, preferably a magnetizable and generally metallic piston section 59 thereof, acts inside the coil 31 as a core of the electromagnet, as has already been indicated.

The closure member 32 is preferably acted upon permanently in the closing direction by a closing force of a closing means or of a closing member. In the present illustrative embodiment, the latter is designed as a permanent magnet which comprises two individual magnets and which exerts a permanent (repelling) magnetic force on the closure member 32. Of course, it is also possible to use other suitable closing means for exerting closing forces, for example restoring springs or the like.

One of the individual magnets of the permanent magnet is preferably arranged at the free end 60 of the abutment part 49, which to this extent also serves as magnet holder, and of which the axial position relative to the closure member 32, or of which the axial distance from the closure member 32, can be adjusted/influenced in the manner already described.

The opposite individual magnets are positioned such that identical poles face towards each other, such that a repelling force is transmitted to the closure member 32, namely the closing force already mentioned above.

As has already been indicated above, the abutment part 49 forms, together with the individual magnets, an adjustable lift limiter for the closure member 32, which lift limiter limits the length of the maximum path by which the closure member 32 can be moved upwards in the interior 30 during the opening movement.

LIST OF REFERENCE SIGNS 10 valve arrangement
11.1 individual module
11.2 individual module
11.3 individual module
11.4 individual module
11.5 individual module
11.6 individual module
11.7 individual module
12 medium portions/glue portions
13 blank
14 valve unit
15 dispensing/dosing opening
16 control lines
17 cable tube
18 medium tube
19 main body
20 medium main duct
21 medium branch duct
22 securing (outer) side
23 cable duct
24 cable branch duct
25 housing
26 screws
27 bore
28 coil carrier
28a head portion
28b coil portion
28c foot portion
30 interior
30a interior sub-portion
30b interior sub-portion
30c interior sub-portion
31 coil
32 closure member
33 shaft
34 closure means
36 valve seat
37 dosing unit
38 receiver for dosing unit
39 opening of the receiver
40 nozzle part
41 securing part
42 receiver wall
43 thread
44 valve lift adjustment unit
45 receiver for lift adjustment unit
46 opening of the receiver
47 adjustment means
48 receiver wall
49 abutment part
50 pin 51 cavity
52 pin receiver
53 form-fit connection
54 attachment
55 medium connector
56 medium duct in head portion
57 annular duct
58 valve chamber
59 piston section
60 free end of abutment part
61 recess
62 sealing ring
63 screw holes

What is claimed is:

1. A valve for free-flowing media comprising:
   a valve housing;
   a closure member, which is movable in the valve housing by an electromagnet and which bears with a closure piece on a valve seat in a closed position of the valve and which sits at least partially in an interior of a one-piece coil carrier on which the windings of a coil of the electromagnet are wound; and
   a valve lift adjustment unit with an elongate abutment part which is arranged at least in part in the interior of the coil carrier and which limits a movement of the closure member in the direction of the valve lift adjustment unit,
   wherein the valve lift adjustment unit is secured on the coil carrier,
   wherein the coil carrier has a coil portion onto which the coil is wound, and also an adjoining head portion with a terminal receiver for the valve lift adjustment unit, wherein the terminal receiver for the valve lift adjustment unit is formed by an end portion of the coil carrier interior surrounded by the head portion, and by a wall of the head portion surrounding this end portion,
   wherein the valve further comprises a medium delivery duct located in the head portion of the coil carrier, which medium delivery duct begins on the outside of the coil carrier and extends as far as the interior of the coil carrier, and through which medium delivery duct the medium to be discharged through the valve can be delivered to the interior, and
   wherein the coil carrier has a foot portion with a terminal receiver for a dosing unit, wherein the dosing unit is releasably connected to the terminal receiver for the dosing unit, wherein the closure member and the valve seat are part of the dosing unit.

2. The valve according to claim 1, wherein the dosing unit is releasably connected to the coil carrier by a screw connection.

3. The valve according to claim 1, wherein the coil portion and the head portion laterally surround or enclose the interior of the coil carrier.

4. The valve according to claim 1, wherein the interior in the area of the head portion, or the interior surrounded by the head portion, has greater transverse dimensions than in the area of the coil portion or than the interior surrounded by the coil portion.

5. The valve according to claim 1, wherein the coil carrier is produced from a metallic material.

6. The valve according to claim 5, wherein the interior of the coil carrier connects to or opens into a valve chamber of the dosing unit surrounded at least in part by the valve seat of the dosing unit.

7. The valve according to claim 6, wherein the dosing unit comprises a nozzle that forms the valve seat.

8. The valve according to claim 7, wherein the dosing unit is connected to the terminal receiver by a securing part of the dosing unit.

9. The valve according to claim 8, wherein the dosing unit is connected to the terminal receiver by a sleeve nut.

10. The valve according to claim 1, wherein the valve lift adjustment unit has an abutment part carrier which is connected to the coil carrier and on which the abutment part is secured.

11. The valve according to claim 10, wherein the abutment part carrier is an adjustment screw.

12. The valve according to claim 10, wherein the abutment part carrier is an adjustment screw.

13. The valve according to claim 1, wherein the coil carrier, the valve lift adjustment unit and the dosing unit are designed in such a way and oriented relative to one another in such a way that the abutment part of the valve lift adjustment unit and the closure member of the dosing unit are positioned centrally in the interior of the coil carrier and in succession along a common axis.

14. The valve according to claim 13, wherein the closure member is guided in the axial direction through a hollow cylindrical wall of the coil portion of the coil carrier in the interior.

15. The valve according to claim 14, wherein the interior portion of the coil carrier surrounded by the receiver for the valve lift adjustment unit, the interior portion thereof surrounded by the coil portion, and the interior portion thereof surrounded by the receiver for the dosing unit are arranged along a common axis.

16. The valve according to claim 13, wherein the interior portion of the coil carrier surrounded by the receiver for the valve lift adjustment unit, the interior portion thereof surrounded by the coil portion, and the interior portion thereof surrounded by the receiver for the dosing unit are arranged along a common axis.

* * * * *